US011147368B2

(12) United States Patent
Vandersluis

(10) Patent No.: US 11,147,368 B2
(45) Date of Patent: Oct. 19, 2021

(54) NOTEBOOK COMPUTER LEG SUPPORT APPARATUS

(71) Applicant: Merle Vandersluis, Seattle, WA (US)

(72) Inventor: Merle Vandersluis, Seattle, WA (US)

( * ) Notice: Subject to any disclaimer, the term of this patent is extended or adjusted under 35 U.S.C. 154(b) by 0 days.

(21) Appl. No.: 16/720,260

(22) Filed: Dec. 19, 2019

(65) Prior Publication Data

US 2021/0186208 A1 Jun. 24, 2021

(51) Int. Cl.
*A47B 23/00* (2006.01)
*A47B 23/04* (2006.01)
*A47B 23/06* (2006.01)
*F16M 13/04* (2006.01)
*F16M 13/00* (2006.01)
*A45F 5/00* (2006.01)

(52) U.S. Cl.
CPC ............ *A47B 23/002* (2013.01); *A47B 23/04* (2013.01); *A47B 23/043* (2013.01); *A47B 23/06* (2013.01); *A45F 5/00* (2013.01); *A45F 2200/0525* (2013.01); *A47B 2023/049* (2013.01); *F16M 13/00* (2013.01); *F16M 13/04* (2013.01)

(58) Field of Classification Search
CPC .............. A47B 23/002; A47B 21/0314; A47B 2023/049; A47B 23/06; A47B 23/043; A47B 23/042; A47B 13/16; A47B 23/044; A47B 13/081; F16M 13/04; F16M 13/00; F16M 11/22; G03B 17/561; G03B 17/563; E05D 11/06
See application file for complete search history.

(56) References Cited

U.S. PATENT DOCUMENTS

| 2,219,091 | A | * | 10/1940 | Henderson | ........... A47B 23/043 248/452 |
| 3,123,935 | A | * | 3/1964 | Williams | ............... A47B 13/16 248/346.01 |
| 3,169,745 | A | * | 2/1965 | Wehringer | ............. A47B 27/00 248/454 |
| 3,178,761 | A | * | 4/1965 | Restaino | ................. E05D 7/105 16/257 |
| 3,424,283 | A | * | 1/1969 | Sheldon | .................... A45C 9/00 190/11 |
| 3,652,051 | A | * | 3/1972 | McFarlane | ........... A47B 23/001 248/444 |

(Continued)

FOREIGN PATENT DOCUMENTS

FR 2739005 A1 * 3/1997 ............. A47B 19/08
WO 2012137196 10/2012

*Primary Examiner* — Jonathan Liu
*Assistant Examiner* — Taylor L Morris

(57) ABSTRACT

A notebook computer leg support apparatus for securing a notebook computer on one leg includes a base and a pair of foldable legs coupled to the base. Each leg is hingingly coupled to the base left side and the base right side, respectively, and moves between an extended position substantially perpendicular to the base and a folded position adjacent a base bottom side. The legs in the extended position are configured to receive a user's thigh therebetween. An arm has an arm proximal end hingingly coupled to the base backside adjacent the base top side, an arm distal end, an arm left edge, an arm right edge, an arm inner side, and an arm outer side. The arm distal end is hooked and configured to secure a screen of a notebook computer. The arm moves between a use position and a store position.

7 Claims, 5 Drawing Sheets

(56) References Cited

U.S. PATENT DOCUMENTS

| | | | | |
|---|---|---|---|---|
| 3,976,163 A * | 8/1976 | Watkinson | A45C 9/00 | 182/20 |
| 4,323,214 A * | 4/1982 | DeLuca | A47B 23/043 | 248/452 |
| 4,991,908 A * | 2/1991 | Krechel | A47C 16/02 | 108/132 |
| 4,998,703 A * | 3/1991 | Stewart | A47B 23/04 | 248/446 |
| 5,042,771 A * | 8/1991 | Demarest, Jr. | A47B 23/043 | 248/451 |
| 5,127,339 A * | 7/1992 | Hood, Jr. | A47B 23/002 | 108/42 |
| 5,218,912 A * | 6/1993 | Buske | A47B 3/08 | 108/14 |
| 5,244,255 A * | 9/1993 | Mill | A47C 16/02 | 248/222.52 |
| 5,263,423 A | 11/1993 | Anderson | | |
| 5,290,002 A * | 3/1994 | Cohen | A47B 23/043 | 248/456 |
| 5,341,929 A * | 8/1994 | Stefancin, Jr. | A47B 21/0314 | 206/320 |
| 5,433,415 A * | 7/1995 | Samson | A47B 23/043 | 248/448 |
| 5,485,980 A * | 1/1996 | Luccia | A47B 23/007 | 248/444.1 |
| 5,553,824 A * | 9/1996 | Dutra, Jr. | G06F 1/1632 | 248/346.07 |
| 5,639,053 A * | 6/1997 | Dmitriev | A47B 23/043 | 248/453 |
| 5,690,309 A * | 11/1997 | Blum | A47B 23/041 | 248/444 |
| 5,762,250 A * | 6/1998 | Carlton | G06F 1/163 | 224/579 |
| 5,772,171 A * | 6/1998 | Masaoka | A01G 5/02 | 248/220.31 |
| 5,971,148 A * | 10/1999 | Jackson | G06F 1/1628 | 108/43 |
| 6,113,050 A * | 9/2000 | Rush | A47B 23/042 | 248/346.01 |
| 6,116,165 A * | 9/2000 | Kadesky | A47B 23/002 | 108/161 |
| 6,418,010 B1 * | 7/2002 | Sawyer | F16M 11/14 | 361/679.05 |
| 6,491,278 B1 * | 12/2002 | Thomsen | A47B 23/042 | 108/180 |
| 6,496,360 B1 * | 12/2002 | Cordes | A47B 23/002 | 108/43 |
| 6,568,506 B1 * | 5/2003 | Donnalley | A47C 12/02 | 108/129 |
| 6,604,472 B2 * | 8/2003 | McNeil | A45C 13/00 | 108/152 |
| 6,663,072 B1 | 12/2003 | Ritchey | | |
| 7,118,083 B2 * | 10/2006 | Liang | G06F 3/0202 | 248/442.2 |
| 7,207,540 B2 * | 4/2007 | Thomas | F16M 13/00 | 248/346.01 |
| 7,611,117 B1 * | 11/2009 | Lang, Jr. | G06F 1/1611 | 248/452 |
| 7,706,673 B1 * | 4/2010 | Staudinger | H04N 5/2251 | 396/58 |
| 7,918,427 B2 * | 4/2011 | Wang | F16M 13/00 | 248/278.1 |
| 8,077,151 B2 * | 12/2011 | Morooka | G06F 1/1656 | 345/168 |
| 8,136,459 B2 * | 3/2012 | Buckland | A47B 41/06 | 108/69 |
| 8,172,191 B1 * | 5/2012 | Zimbalatti | F16M 11/10 | 248/346.01 |
| 8,322,290 B1 * | 12/2012 | Mignano | A47B 23/043 | 108/9 |
| 8,424,465 B2 * | 4/2013 | Florendo, Jr. | A47B 23/043 | 108/9 |
| 8,465,100 B2 * | 6/2013 | Kim | A47C 16/025 | 297/423.41 |
| 8,807,406 B1 * | 8/2014 | Thach | A45F 5/00 | 224/275 |
| 8,820,310 B1 * | 9/2014 | Plott | A47J 37/0713 | 126/30 |
| 8,864,089 B2 * | 10/2014 | Hung | F16M 11/041 | 248/274.1 |
| 9,010,701 B1 * | 4/2015 | Cooper | F16M 13/00 | 248/166 |
| 9,353,904 B2 * | 5/2016 | Sun | G06F 1/16 | |
| 9,364,079 B2 * | 6/2016 | Brennan | A47B 21/0314 | |
| 9,364,081 B1 * | 6/2016 | Haymond | F16M 11/38 | |
| 9,377,810 B2 * | 6/2016 | Hishinuma | G06F 1/1628 | |
| 9,420,712 B2 * | 8/2016 | Yang | F16M 11/38 | |
| 9,470,356 B1 * | 10/2016 | Zaloom | A47B 23/04 | |
| 9,510,673 B2 * | 12/2016 | Fountain, Jr. | F16B 2/12 | |
| 9,538,852 B2 | 1/2017 | Levy | | |
| 9,551,459 B2 * | 1/2017 | Heyen | F16M 11/16 | |
| 10,001,242 B2 * | 6/2018 | van Hooft | F16M 11/38 | |
| 10,021,957 B1 | 7/2018 | Bryan | | |
| 10,488,740 B2 * | 11/2019 | Jeong | F16M 13/04 | |
| 2003/0071184 A1 | 4/2003 | Parkinson | | |
| 2003/0079661 A1 * | 5/2003 | Luu | A47B 3/08 | 108/116 |
| 2004/0001047 A1 * | 1/2004 | Wang | G06F 1/1632 | 345/168 |
| 2007/0277711 A1 * | 12/2007 | Grant | A47G 23/0608 | 108/160 |
| 2008/0054149 A1 * | 3/2008 | Freebairn | F16M 13/00 | 248/346.02 |
| 2008/0061205 A1 * | 3/2008 | Park | H04M 1/04 | 248/291.1 |
| 2009/0229497 A1 | 9/2009 | Persico | | |
| 2009/0272779 A1 * | 11/2009 | Vu | A45F 5/00 | 224/677 |
| 2009/0314189 A1 * | 12/2009 | Meharg | A47B 23/002 | 108/129 |
| 2010/0078928 A1 * | 4/2010 | Mercieca | B42D 9/00 | 281/42 |
| 2010/0090085 A1 * | 4/2010 | Corrion | F16M 11/38 | 248/459 |
| 2010/0259876 A1 * | 10/2010 | Kim | G06F 1/166 | 361/679.01 |
| 2011/0121156 A1 * | 5/2011 | Lee | A47B 23/043 | 248/463 |
| 2011/0133050 A1 * | 6/2011 | Eisenberger, Sr. | F16M 13/00 | 248/551 |
| 2011/0219988 A1 * | 9/2011 | Stephens | A47B 13/081 | 108/6 |
| 2012/0246879 A1 * | 10/2012 | Pestal | A47B 23/002 | 24/3.2 |
| 2012/0325995 A1 | 12/2012 | Balestrino | | |
| 2013/0187024 A1 * | 7/2013 | Obujen | F16M 13/022 | 248/693 |
| 2013/0214022 A1 * | 8/2013 | Harvey | F16M 11/041 | 224/623 |
| 2014/0158845 A1 * | 6/2014 | Fliger | G03B 17/566 | 248/309.1 |
| 2014/0263939 A1 * | 9/2014 | Rinner | F16M 11/10 | 248/688 |
| 2017/0108167 A1 * | 4/2017 | Fan | F16M 11/041 | |
| 2017/0196353 A1 * | 7/2017 | Iacoviello | F16M 13/04 | |
| 2018/0235363 A1 * | 8/2018 | Murphy | A47B 23/043 | |
| 2019/0038018 A1 * | 2/2019 | Hill | F16M 11/041 | |
| 2019/0166987 A1 * | 6/2019 | Diaz | A47B 23/043 | |
| 2020/0232598 A1 * | 7/2020 | Roudaut | F16M 11/041 | |

\* cited by examiner

NOTEBOOK COMPUTER LEG SUPPORT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to notebook computer accessory device and more particularly pertains to a new notebook computer accessory devices for securing a notebook computer on one leg.

(2) Description of Related Art Including Information Disclosed Under 37 CFR 1.97 and 1.98

The prior art relates to notebook computer accessory devices.

BRIEF SUMMARY OF THE INVENTION

An embodiment of the disclosure meets the needs presented above by generally comprising a base having a base top side, a base bottom side, a base front side, a base back side, a base left side, and a base right side. A pair of foldable legs comprises a left leg and a right leg coupled to the base. Each leg has a leg proximal side, a leg distal side, a leg front side, a leg back side, a leg outer side, and a leg inner side. The leg proximal side of the left leg and the right leg are hingingly coupled to the base left side and the base right side, respectively, and move between an extended position substantially perpendicular to the base and a folded position adjacent the base bottom side. The legs in the extended position are configured to receive a user's thigh therebetween. An arm has an arm proximal end hingingly coupled to the base backside adjacent the base top side, an arm distal end, an arm left edge, an arm right edge, an arm inner side, and an arm outer side. The arm distal end is hooked and configured to secure a screen of a notebook computer. The arm moves between a use position extending away from the base top side and a store position adjacent the base top side.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
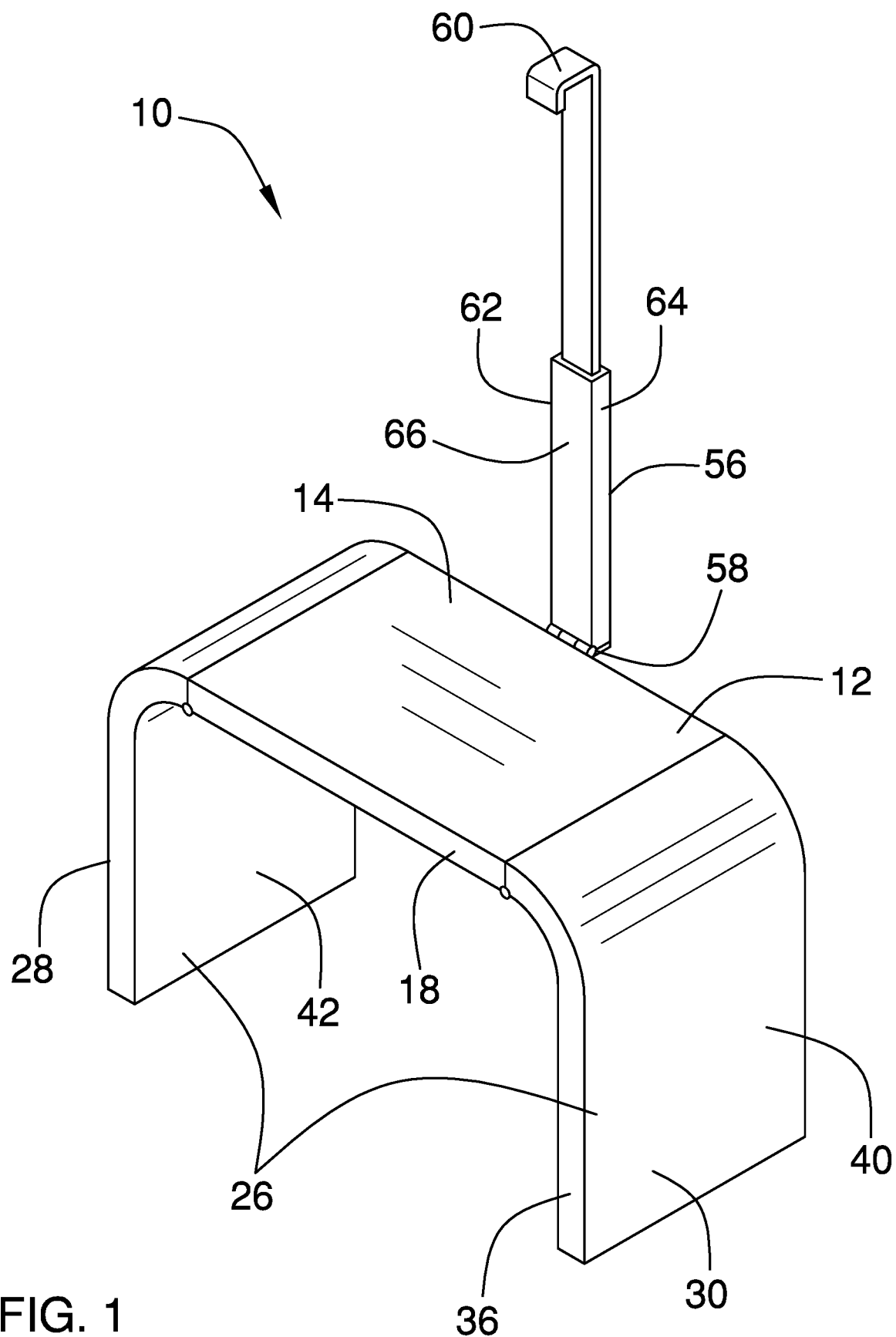
FIG. 1 is an isometric view of a notebook computer leg support apparatus according to an embodiment of the disclosure.
Figure 2:
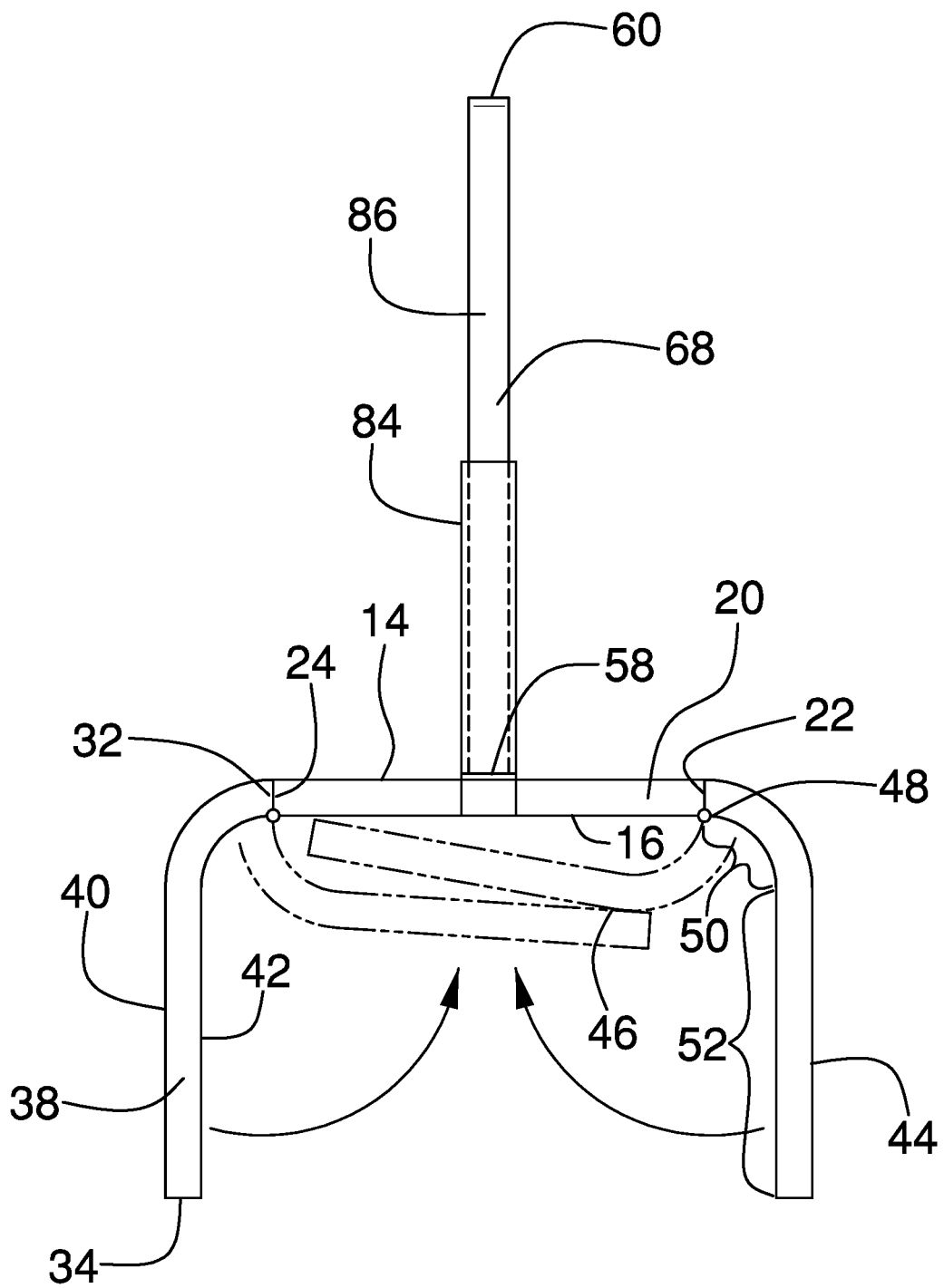
FIG. 2 is a rear elevation view of an embodiment of the disclosure.
Figure 3:
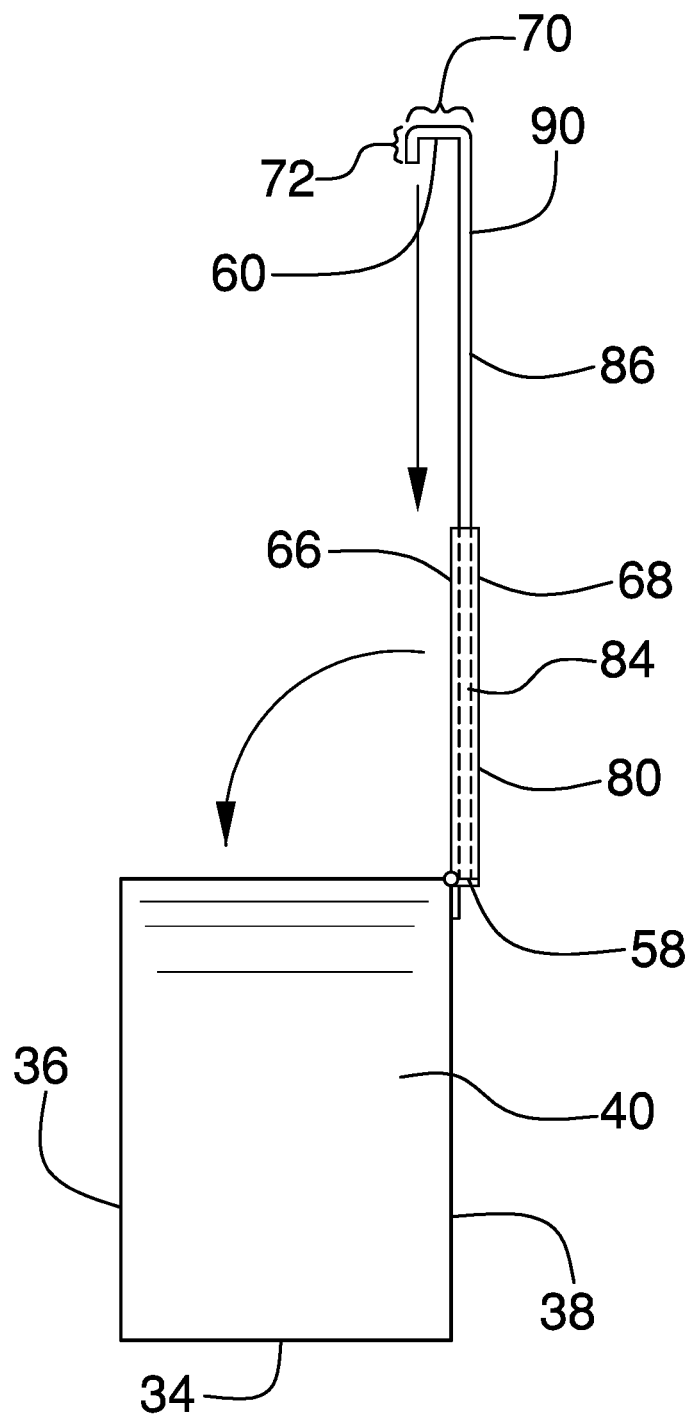
FIG. 3 is a side elevation view of an embodiment of the disclosure.
Figure 4:
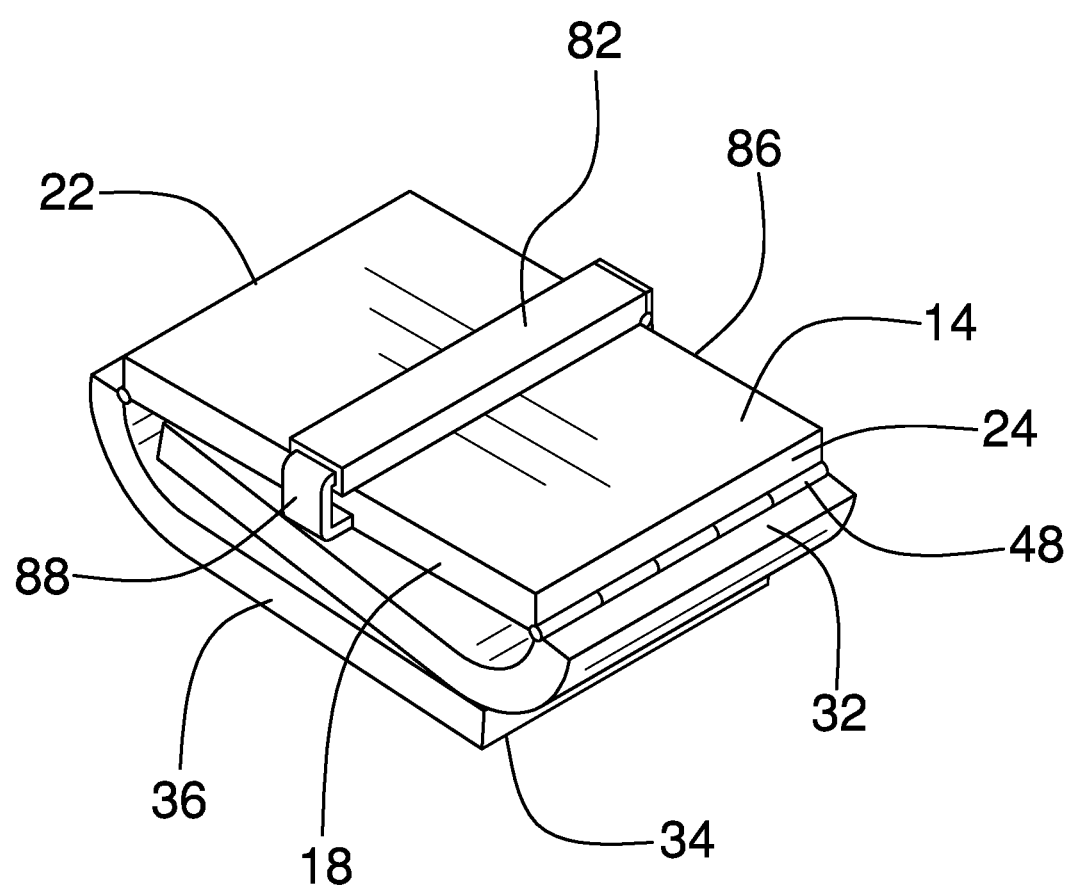
FIG. 4 is an isometric view of an embodiment of the disclosure.
Figure 5:
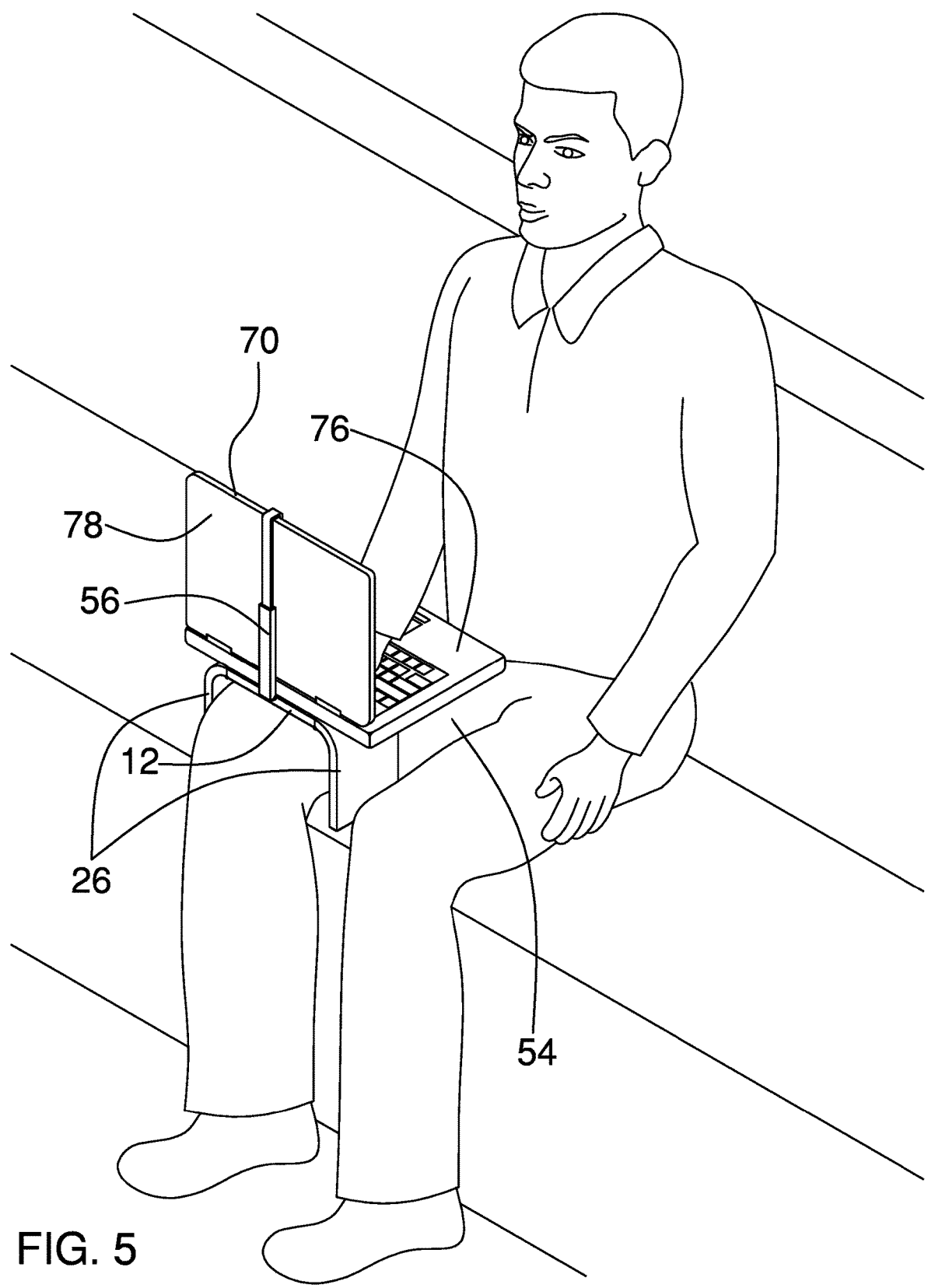
FIG. 5 is an in-use view of an embodiment of the disclosure.

With reference now to the drawings, and in particular to FIGS. 1 through 5 thereof, a new notebook computer accessory device embodying the principles and concepts of an embodiment of the disclosure and generally designated by the reference numeral 10 will be described.

As best illustrated in FIGS. 1 through 5, the notebook computer leg support apparatus 10 generally comprises a base 12 having a base top side 14, a base bottom side 16, a base front side 18, a base back side 20, a base left side 22, and a base right side 24. A pair of foldable legs 26 is coupled to the base 12 and comprise a left leg 28 and a right leg 30 each having a leg proximal side 32, a leg distal side 34, a leg front side 36, a leg back side 38, a leg outer side 40, and a leg inner side 42. The leg proximal side 32 of the left leg 28 and the right leg 30 is hingingly coupled to the base left side 22 and the base right side 24, respectively, and moves between an extended position 44 substantially perpendicular to the base 12 and a folded position 46 adjacent the base bottom side 16. A leg hinge 48 of each leg 26 may extend from the base front side 18 to the base back side 20. Each leg 26 has a curved portion 50 extending from the leg proximal side 32 and a straight portion 52 extending from the curved portion 50 to the leg distal side 34 such that the leg proximal side 32 lies in a plane perpendicular to a plane of the leg distal side 34. The leg proximal side 32 in the extended position 44 lies coplanar to the respective base left side 22 or base right side 24. The legs 26 in the extended position 44 are configured to receive a user's thigh 54 therebetween.

An arm 56 has an arm proximal end 58 hingingly coupled to the base backside 20 adjacent the base top side 14, an arm distal end 60, an arm left edge 62, an arm right edge 64, an arm inner side 66, and an arm outer side 68. The arm distal end 60 is hooked and may have a perpendicular extension portion 70 and a perpendicular return portion 72 configured to secure a screen 74 of a notebook computer 76. The arm inner side 66 is configured to secure a screen backside 78 of the screen 74. The arm 56 moves between a use position 80 extending away from the base top side 14 and a store position 82 adjacent the base top side 14. The arm 56 may be telescopbale and may comprise a lower portion 84 and an upper portion 86. The lower portion 84 is a rectangular tube section and the upper portion 86 slides within the lower portion 84 between a compacted position 88 and a lengthened position 90.

In use, the user moves the legs 26 to the extended position 44 and places them around his thigh 54. The arm 56 is moved to the use position 80 with the upper portion 86 in the lengthened position 90 and the notebook computer 76 is placed on the base top side 14. The upper portion 86 is then moved towards the compacted position 88 until the arm distal end secures the screen 74.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A notebook computer leg support apparatus comprising:
   a base, the base having a base top side, a base bottom side, a base front side, a base back side, a base left side, and a base right side, the base top side being planar;
   a pair of foldable legs coupled to the base, the pair of foldable legs comprising a left leg and a right leg each having a leg proximal side, a leg distal side, a leg front side, a leg back side, a leg outer side, and a leg inner side, the leg proximal side of the left leg and the right leg being hingedly coupled to the base left side and the base right side, respectively, and moving between an extended position substantially perpendicular to the base and a folded position adjacent the base bottom side, the leg distal side of each of the right leg and the left leg being a free edge wherein said pair of foldable legs in the extended position define a free space continuously from the leg distal side of each of the left leg and the right leg to the base bottom side, the legs in the extended position being configured to receive a user's thigh therebetween;
   an arm coupled to the base, the arm having an arm distal end, an arm left edge, an arm right edge, an arm inner side, and an arm outer side, the arm having an arm proximal end hingedly coupled to the base backside adjacent the base top side such that the arm inner side is coplanar with the base backside when the arm is perpendicular to the base, the arm distal end being hooked such that said arm distal end extends over and back towards the base top side wherein the arm is configured to secure a screen of a notebook computer resting on the base, the arm moving between a use position extending away from the base top side and a store position adjacent the base top side; and
   a leg hinge of each leg extending from the base front side to the base back side.

2. The notebook computer leg support apparatus of claim 1 further comprising each leg having a curved portion extending from the leg proximal side and a straight portion extending from the curved portion to the leg distal side such that the leg proximal side lies in a plane perpendicular to a plane of the leg distal side, the leg proximal side in the extended position lying coplanar to the respective base left side or base right side.

3. The notebook computer leg support apparatus of claim 1 further comprising the legs in the folded position securing the right leg between the left leg and the base bottom side.

4. The notebook computer leg support apparatus of claim 1 further comprising the arm being telescopable.

5. The notebook computer leg support apparatus of claim 4 further comprising the arm comprising a lower portion and an upper portion, the lower portion being a rectangular tube section and the upper portion sliding within the lower portion between a compacted position and a lengthened position.

6. The notebook computer leg support apparatus of claim 1 further comprising the arm distal end having a perpendicular extension portion and a perpendicular return portion.

7. A notebook computer leg support apparatus comprising:
   a base, the base having a base top side, a base bottom side, a base front side, a base back side, a base left side, and a base right side, the base top side being planar;
   a pair of foldable legs coupled to the base, the pair of foldable legs comprising a left leg and a right leg each having a leg proximal side, a leg distal side, a leg front side, a leg back side, a leg outer side, and a leg inner side, the leg proximal side of the left leg and the right leg being hingedly coupled to the base left side and the base right side, respectively, and moving between an extended position substantially perpendicular to the base and a folded position adjacent the base bottom side, the leg distal side of each of the right leg and the left leg being a free edge wherein said pair of foldable legs in the extended position define a free space continuously from the leg distal side of each of the left leg and the right leg to the base bottom side, a leg hinge of each leg extending from the base front side to the base back side, each leg having a curved portion extending from the leg proximal side and a straight portion extending from the curved portion to the leg distal side such that the leg proximal side lies in a plane perpendicular to a plane of the leg distal side, the leg proximal side in the extended position lying coplanar to the respective base left side or base right side, the legs in the extended position being configured to receive a user's thigh therebetween; and an arm coupled to the base, the arm having an arm distal end, an arm left edge, an arm right edge, an arm inner side, and an arm outer side, the arm having an arm proximal end hingedly coupled to the base backside adjacent the base top side such that the arm inner side is coplanar with the base backside when the arm is perpendicular to the base, the arm distal end being hooked such that said arm distal end extends over and back towards the base top side, the arm distal end having a perpendicular extension portion and a perpendicular return portion wherein the arm is configured to secure a screen of a notebook computer resting on the base, the arm moving between a use position extending away from the base top side and a store position adjacent the base top side, the arm being telescopable and comprising a lower portion and an upper portion, the lower portion being a rectangular lube section and the upper portion sliding within the lower portion between a compacted position and a lengthened position.

\* \* \* \* \*